United States Patent [19]
Arita

[11] 3,774,636
[45] Nov. 27, 1973

[54] SELF-SEALING COUPLING ASSEMBLY
[75] Inventor: Teiji Arita, Yokohama, Japan
[73] Assignee: The Yokohama Rubber Co. Ltd., Tokyo, Japan
[22] Filed: Aug. 25, 1972
[21] Appl. No.: 283,710

[30] Foreign Application Priority Data
Aug. 27, 1971 Japan.............................. 46/65172

[52] U.S. Cl................ 137/614.04, 285/24, 137/615
[51] Int. Cl.......................... F16l 27/10, F16l 37/00
[58] Field of Search................ 137/615, 616, 616.3, 137/616.5, 614.01, 614.02, 614.03, 614.04, 614.05, 614.06; 285/24

[56] References Cited
UNITED STATES PATENTS

| | | | |
|---|---|---|---|
| 2,451,441 | 10/1948 | Main, Jr...................... | 137/614.03 X |
| 2,456,045 | 12/1948 | Brock ........................... | 137/614.03 |
| 3,231,297 | 1/1966 | Watts et al........................... | 285/24 |
| 3,534,984 | 10/1970 | Shuey ................................... | 285/24 |
| 3,211,477 | 10/1965 | McCoy ............................: | 285/24 X |

Primary Examiner—Samuel Scott
Assistant Examiner—Ira S. Lazarus
Attorney—Bucknam & Archer

[57] ABSTRACT

A self-sealing coupling assembly is provided for absorbing misalignment between the male and female coupling members. The assembly comprises a reciprocally movable fluid feeding unit and a stationary fluid receiving unit operatively associated therewith, said feeding unit having a movable block, a male coupling holder rotatably and resiliently connected to said block and a plurality of male coupling members and guide prong both mounted on said male coupling holder, and said receiving unit having a stationary bed, a female coupling holder connected rotatably and resiliently to said stationary bed, a guide prong receiving aperture formed in said female coupling holder and a plurality of female coupling members mounted on said female coupling holder, the arrangement being that alignment correction is effected cooperatively by the male and female units.

3 Claims, 7 Drawing Figures

SELF-SEALING COUPLING ASSEMBLY

This invention relates to a self-sealing coupling assembly for simultaneously connecting and disconnecting a plurality of coupling machineries, steel works and the like.

Couplings of this type generally consist of a male or feeding unit connected at one end to a source of fluid supply and a female or receiving unit connected at one end to conduits leading to the operating equipment at the destinations, both units having interengageably coupling elements at their respective other ends.

There are occasions where these coupling elemnts are misaligned either laterally or angularly so that they cannot be engaged with each other. To absorb or otherwise compensate for such alignment, special machining workmanship has been necessitated to finish the couplings to a maximum precision entailing extremely high manufacturing costs, and rather complicated mechanical or electrical controls have been required to effect a joint to such couplings. Furthermore, considerable space has been required to provide easy access to each individual coupling where a number of conduits are connected or disconnected one after another.

Whereas, it is the primary object of the present invention to eliminate the above noted difficulties encountered with conventional self-sealing couplings.

It is a more specific object of the invention to provide an improved self-sealing coupling assembly which is capable of connecting and disconnecting simultaneously a plurality of fluid pressure lines and which is highly reliable in operation.

It is another specific object of the invention to provide an improved self-sealing coupling assembly having means for correcting misalignment of the male and female coupling elements occurring in any direction and in large magnitudes that have not been effectively absorbed by prior-art devices.

These and other objects and features of the invention will be better understood from the following description taken in connection with the accompanying drawings in which.

Figure 1:
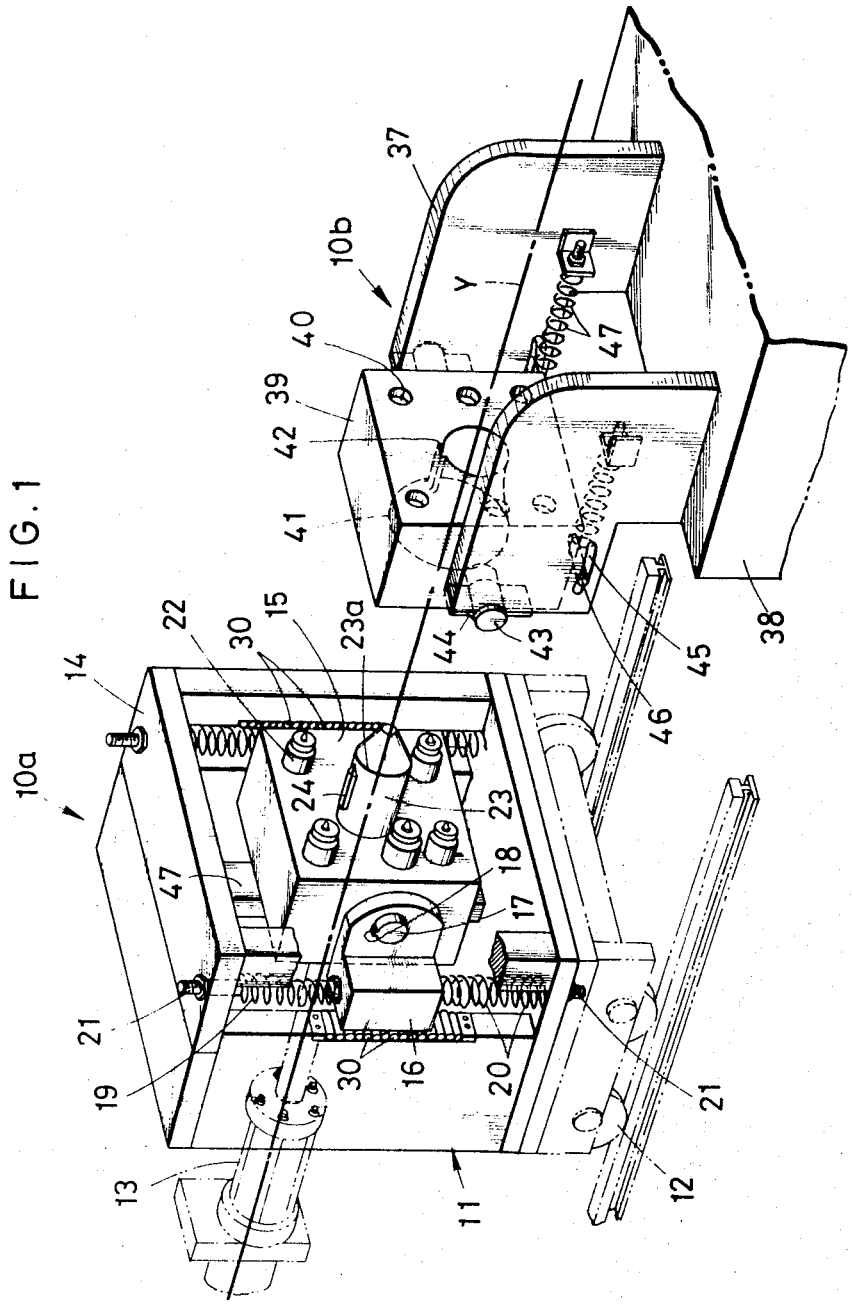
FIG. 1 is a partially sectional perspective view of a coupling assembly embodying the present invention.
Figure 2:
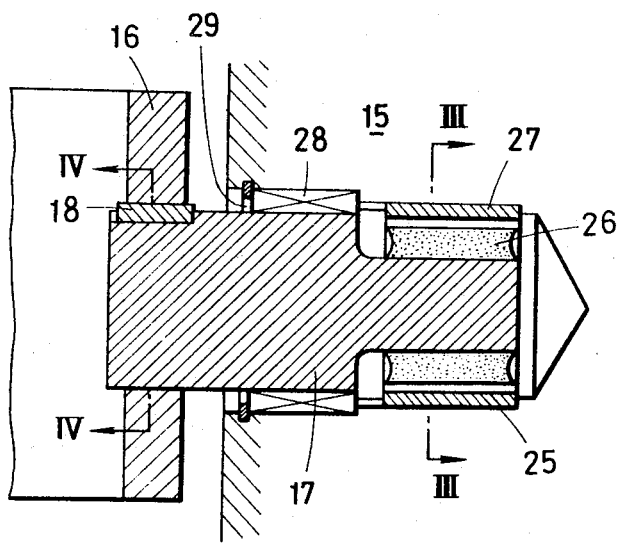
FIG. 2 is a sectional view of an annular torsion spring of the coupling assembly shown in FIG. 1.
Figure 3:
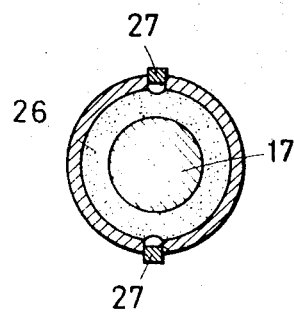
FIG. 3 is a cross sectional view along the line III—III of FIG. 2.
Figure 4:
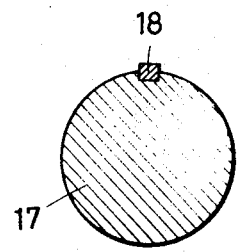
FIG. 4 is a cross sectional view along the line IV—IV of FIG. 2.
Figure 5:
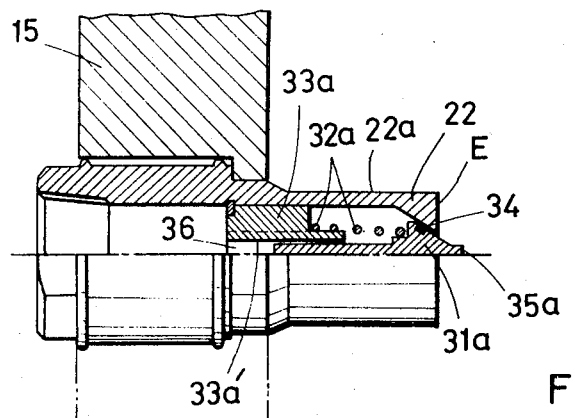
FIG. 5 is a partly sectional plan view of a male coupling element according to the present invention.
Figure 6:
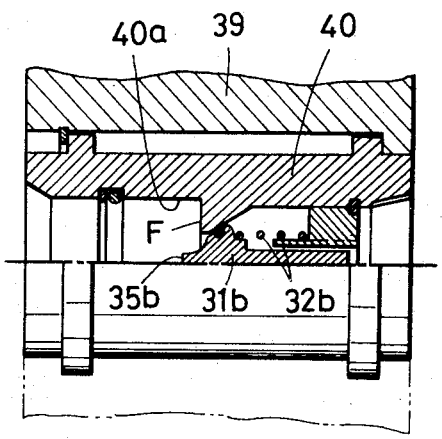
FIG. 6 is a partly sectional plan view of a female coupling element according to the present invention.

Referring now to the drawings and FIG. 1 in particular, there is shown a coupling assembly which consists of a male or feeding unit 10a and a female or receiving unit 10b interengageable therewith. The male or feeding unit 10a comprises a movable block 11 having wheels 12 and connected at one end to a hydraulic or air cylinder 13 adapted to drive or move the block 11 toward and away from the female unit 10b and a frame 14 fixed at the other end of the block 11. A male coupling holder plate 15 is secured to side bracket members 16 by pins 17 each having a key 18. The bracket members 16 are resiliently held in position or supported in suspension by coil springs 19, 20 connected respectively by bolts 21 to the upper and lower ends of the frame 14. On the male coupling holder 15 are distributed and mounted a plurality of male coupling members 22. A guide prong 23 having a guide key 24 is mounted on and positioned centrally of the holder 15. As shown in FIG. 2, the support pin 17 is resiliently engaged in a groove 25 formed in each side of the male coupling holder 15 by means of an annular torsion spring 26 accommodated in the circumferential interior of the pin 17. A key 27 is adapted to hold the pin 17 in position relative to the holder 15. To minimize the friction of the pin 17 with the male coupling holder 15 during its torsional movement, a needle bearing 28 is mounted through a snap ring 29 on the pin 17 as shown in FIG. 2. The bracket member 16 is movable in sliding contact with a guide member 30 consisting of idling rollers.

A valve means 31a for opening and closing the passage of a fluid is mounted in the interior of and operatively associated with the coupling member 22. This valve means 31a, preferably in the form of a poppet valve as shown, in loaded with a helically coiled compression spring 32a interposed between its inner wall and a spring seat 33a. The valve 31a is thus normally urged by this spring toward an 0-sealing ring 34 provided in the fluid passage to close the same.

The valve 31a is provided with a rounded operating tip 35a which is disposed for abutting engagement with corresponding portion of a valve means in a female coupling member. The spring seat 33a has an inner surface 33a' disposed for sliding engagement with the valve 31a as the latter is retracted through a clearance 36 against the tension of the spring 32a. The female or receiving unit 10b is shown as being held stationary relative to the mobile male unit 10b, although the arrangement may be vice versa depending upon operating environments and design choice. The female or receiving unit 10b essentially comprises a pair of opposed L-shaped supporting arms 37 which are secured to a stationary bed 38 and a female coupling holder 39 having mounted thereon a plurality of female coupling members 40 and formed guide prong receiving aperture 41 centrally thereof. The aperture 41 is flared progressively outwardly so that it can flexibly accept and fit with the incoming guide prong 23 with its key groove 42 registered and engaged with the guide key 24 of the latter. The female coupling holder 39 is rotatably or swingably supported on the opposed arms 37 through a pair of pins 43 pivotally supported on bearings 44. The holder 39 is provided in arcuate grooves 45 in the arms 37 thereby limiting the range of movement of the female holder 39. A spring 47 secured to the arm 37 is adapted to hold the pin 46 resiliently in position.

Figure 7:
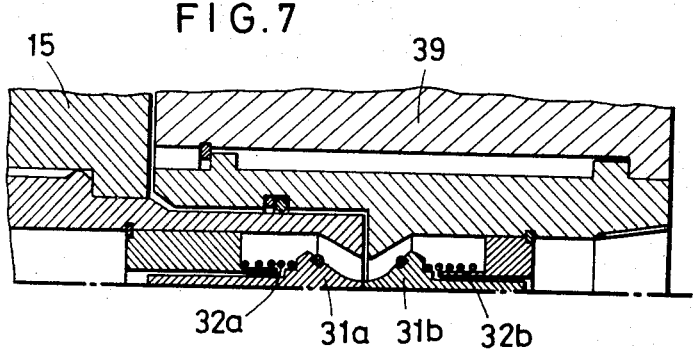
FIG. 7 is a cross sectional view showing the male element of FIG. 5 and the female coupling element of FIG. 6 in locked engagement with each other.

With this construction, the male unit 10a is moved toward the female unit 10b to bring the male coupling members 22 progressively into engagement with the female coupling members 40. Assuming that there is a misalignment in the center axis Y between the guide prong 23 and the aperture 41, the peripheral shoulder 23a of the prong 23 abuts against a rounded marginal portion of the aperture 41 and causes the female coupling holder 39 to move about the pin 43 for a distance corresponding to the amount of misalignment. At the same time the male coupling holder 15 moves about its pin 17, absorbing the errors of alignment relative to the female coupling holder 39. As the male unit 10a further advances until a joint is nearly effected, the male holder 15 is held in abutment to a stopper plate 47 so that the movements of both male and female units 10a and 10b are ceased. With the two mating couplings thus aligned, the operating tip 35a of the valve 31a abuts against the tip 35b of the valve 31b in the female coupling 40. These opposed valves 31a, 31b are thus pressed against each other and retracted progressively against the tension of their respective springs 32a, 32b until the interengaging surface contours 22a and 40a are snugly fitted together with the vertical abutment E of the male coupling stopped in contact with the corresponding abutment F of the female coupling, thereby completing a juncture between the male and female couplings 22, 40 as shown in FIG. 7.

Retracting the male unit 10a separates or disconnects between the male and female couplings 22, 40, with their respective valves 31a, 31b restoring their normally closed condition under the influence of the compression springs 32a, 32b as shown in FIG. 1.

Having thus described the invention, it is to be understood that various changes and modifications may be made in the specific form and construction illustrated, without departing from the scope of the appended claims.

What is claimed is:

1. A self-sealing coupling assembly comprising a reciprocally movable fluid feeding unit and a stationary fluid receiving unit operatively associated therewith, said feeding unit including a movable block, a frame secured thereto, a male coupling holder rotatably and resiliently connected to a support means secured resiliently said frame and a plurality of male coupling members and a guide prong both mounted on said holder, and said receiving unit including a stationary bed, a pair of opposed supporting arms secured thereto, a female coupling holder connected rotatably and resiliently between said supporting arms, a guide prong receiving aperture formed in said female coupling holder and a plurality of female coupling members mounted on said female coupling holder and corresponding in number and position to said male coupling members.

2. The self-sealing coupling assembly of claim 1 wherein said support means includes a bracket member, a torsion spring-loaded pin connecting the same pivotally to said male coupling holder and coil spring members connecting said bracket members to said frame, thereby holding said male coupling holder in suspension.

3. The self-sealing coupling assembly of claim 1 wherein said guide prong receiving aperture is flared progressively outwardly.

* * * * *